(12) United States Patent
Sato

(10) Patent No.: US 6,694,297 B2
(45) Date of Patent: Feb. 17, 2004

(54) TEXT INFORMATION READ-OUT DEVICE AND MUSIC/VOICE REPRODUCTION DEVICE INCORPORATING THE SAME

(75) Inventor: Tatsuhiro Sato, Inagi (JP)

(73) Assignee: Fujitsu Limited, Kawasaki (JP)

( * ) Notice: Subject to any disclaimer, the term of this patent is extended or adjusted under 35 U.S.C. 154(b) by 383 days.

(21) Appl. No.: 09/737,486

(22) Filed: Dec. 18, 2000

(65) Prior Publication Data
US 2001/0027396 A1 Oct. 4, 2001

(30) Foreign Application Priority Data
Mar. 30, 2000 (JP) .................................. 2000-093906

(51) Int. Cl.$^7$ .............................................. G10L 13/00
(52) U.S. Cl. .................... 704/276; 704/270; 704/277
(58) Field of Search ................................. 704/260, 270, 704/275, 276, 278; 386/95; 84/609

(56) References Cited

U.S. PATENT DOCUMENTS 5,936,925 A * 8/1999 Yoshio et al. ................. 369/90
5,956,459 A * 9/1999 Taniguchi et al. ............. 386/95

FOREIGN PATENT DOCUMENTS

| JP | 6-161479 | 6/1994 |
|----|----------|--------|
| JP | 8-101697 | 4/1996 |

* cited by examiner

*Primary Examiner*—Susan McFadden
(74) *Attorney, Agent, or Firm*—Staas & Halsey LLP

(57) ABSTRACT

The present invention has as its object to provide text information to a listener with voice when music is reproduced from a medium on which the text information is stored together with music data and to provide easily and smoothly use of the text information. The present invention is a text information read-out device for reading out text information from a medium on which text information is stored together with music data, including a text information extraction unit for extracting text information, a voice synthesizer obtaining voice data from the extracted text information, and a controller for controlling a read-out timing of the voice data in synchronism with reproduction of music data.

8 Claims, 15 Drawing Sheets

FIG.10

VOICE DATA :

| TITLE ORDER | TEXT INFORMATION |
|---|---|
| 1 | THIS MUSIC IS YESTERDAY OF THE BEATLES. THE MUSIC IS RELEASED IN 1965. |
| 2 | THE MUSIC WHICH WAS PLAYED IS HELP! OF THE BEATLES. |
| 3 | THE MUSIC WHICH IS BEING PLAYED IS YELLOW SUBMARINE OF THE BEATLES. |

IN-MUSIC-MD TEXT INFORMATION(TOC:Table Of Contents):

| TITLE ORDER | COMMENT |
|---|---|
| 1 | THE BEATLES, YESTERDAY |
| 2 | SUTOIKOBITCHI, GRAMPUS |
| 3 | ALICE, VANILLA |

FIG.14

```
POST /~cddb/submit.cgi HTTP/1.0
Category: rock

Discid: 470a6507    <-SERIAL NUMBER OF CD

User-Email: joe@joeshost.joesdomain.com
Submit-Mode: submit
Charset: ISO-8859-1
X-Cddbd-Note: Problems with Super CD Player? Send email to
support@supercd.com.
Content-Length: 820
```

FIG.15

```
DISCID=470a6507          <—SERIAL NUMBER OF CD

DTITLE=Led Zeppelin / Presence  <—TITLE OF CD

TTITLE0=Achilles' Last Stand    <—TITLE OF EACH TRACK
TTITLE1=For Your Life
TTITLE2=Royal Orleans
TTITLE3=Nobody's Fault But Mine
TTITLE4=Candy Store Rock
TTITLE5=Hots On For Nowhere
TTITLE6=Tea For One
EXTD=Producer: Jimmy Page¥nExecutive Producer: Peter Gr
EXTD=ant¥n¥nUPC: 7567-90329-2¥nLABEL: Atlantic Recordin
EXTD=g Corporation¥nYEAR: 1976
EXTT0=Jimmy Page and Robert Plant
EXTT1=Jimmy Page and Robert Plant
EXTT2=John Bonham, John Paul Jones, Jimmy Page and¥nRob
EXTT2=ert Plant
EXTT3=Jimmy Page and Robert Plant
EXTT4=Jimmy Page and Robert Plant
```

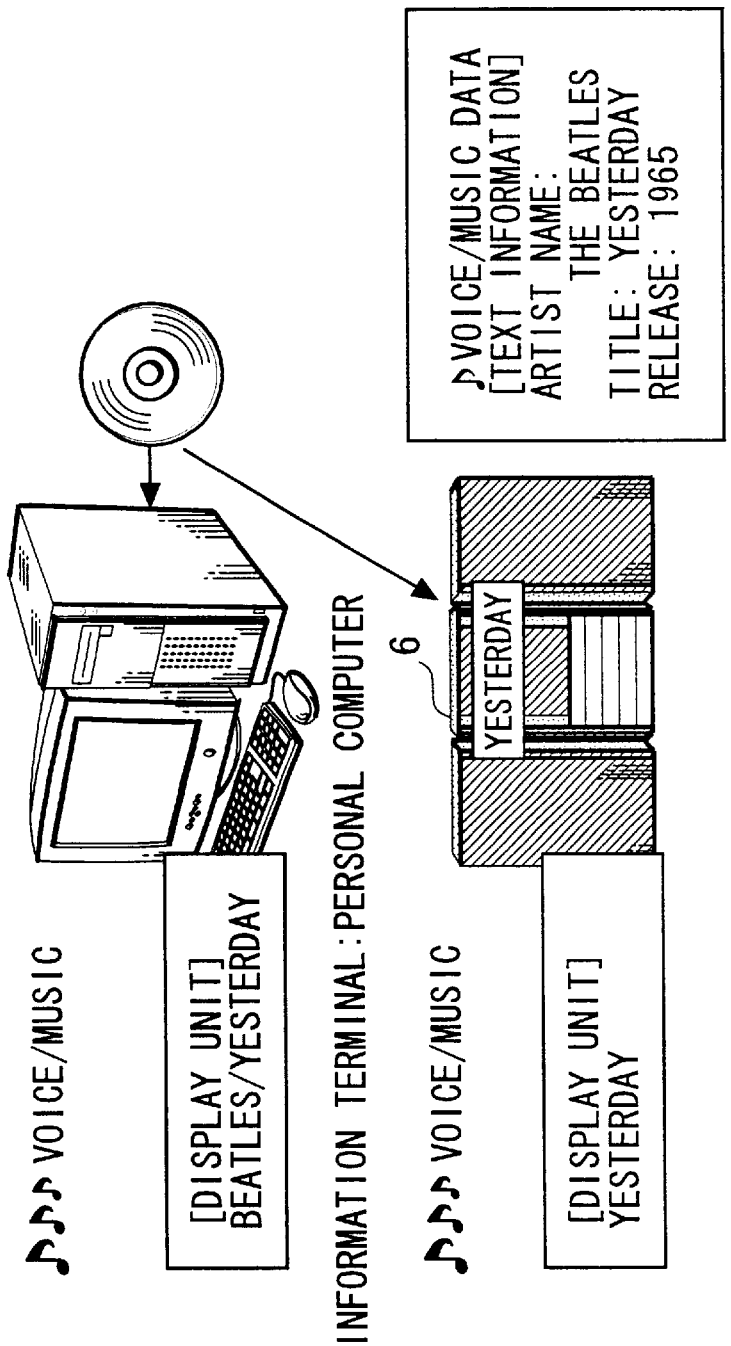

TEXT INFORMATION READ-OUT DEVICE AND MUSIC/VOICE REPRODUCTION DEVICE INCORPORATING THE SAME

BACKGROUND OF THE INVENTION

Field of the Invention

The present invention relates to a text information read-out device and, more particularly, to a read-out technique for text information which is effective when music is reproduced in a music data reproducing device such as a CD player or an MD player or an information terminal such as a personal computer or an electronic databook.

As an information of this type, an music reproducing device using a voice synthesizer disclosed in Japanese Patent Application Laid-Open No. 6-16479 or an electronic book device disclosed in Japanese Patent Application Laid-Open No. 8-101697 are known. Of these devices, the music reproducing device described in Japanese Patent Application Laid-Open No. 6-161479 reproduces data obtained such that a back chorus part of a karaoke performance is stored as a character code. More specifically, the music reproducing device converts the character code into a voice through a voice synthesizer, and reproduces the voice together with music data. In this manner, a reduction in an amount of data in a karaoke device has been achieved.

In addition, the invention described in Japanese Patent Application Laid-Open No. 8-101697 reads text information from an information recording medium. When voice data is added to the information recording medium, the invention reproduces the voice data. When the voice data is not added to the information recording medium, the invention synthesizes voice data from the text information by using the voice synthesizer to output the voice data.

In this manner, conventional various information providing systems to which voice synthesizing devices are applied are proposed. In addition, as a voice synthesizing system, for example, a voice synthesizing program "Voice series" available from FUJITSU LIMITED is known.

On the other hand, in addition to music data itself, text information for explaining the titles pieces of music, a player's name, and the like is added to a medium, e.g., a compact disk (to be referred to as a CD hereinafter) or a mini disk (to be referred to as an MD hereinafter) in which music data is recorded. Identification numbers which are unique in the world are added to these media. Databases such as music title lists which can be searched by using the identification number as a key can be used on Internet. In these databases, in addition to music titles, player's names, composer's names, release years, and the like are recorded as text information.

However, the text information added to the music data can be used in only a music reproducing device having a display device for displaying text information, e.g., a personal computer having a music reproducing function as shown in FIG. 16, a CD player having a liquid crystal display (LCD), or the like. The text information has not been always effectively used in a music reproducing device which does not have such a display device.

Even though a music reproducing device having a display device is used, a user must have had such a posture that the user can see the display device. Therefore, a user has not been able to easily refer to information related to the title, player, composer, and the like of a piece of reproduced music with such a relax posture that the user could listen to music.

SUMMARY OF THE INVENTION

The present invention is made in consideration of the above conventional technique problem. More specifically, the present invention provides text information to a listener with voice when music is reproduced from a medium on which text information is recorded together with music data, and achieves easy and smooth use of the text information.

The present invention employs the following means to solve the above problem.

More specifically, the present invention is a text information read-out device for reading out text information from a medium on which text information is stored together with music data, including:

a text information extraction unit extracting text information;

a voice synthesizer obtaining voice data from the extracted text information; and a controller controlling a read-out timing of the voice data in synchronism with reproduction of music data.

Here, the synchronism means that a read-out start timing is adjusted for reproduction of the music data. For example, the controller may control a read-out timing of the voice data to any one of a reproduction start timing of the music data, a predetermined period of time after the reproduction start timing of the music data, and a reproduction end timing of the music data. In addition, the controller may control a read-out timing of voice data on the basis of a reproduction volume of the music data.

The text information extraction unit extracts text information from a medium on which text information is recorded together with music data. This voice synthesizer converts the text information into voice data. The controller controls a read-out timing of the voice data in synchronism with reproduction of the music data. The read-out timing of the voice data is the time when the voice data is output to the outside through a loudspeaker or the like.

The present invention, as described above, reads out text information for a listener in synchronism with reproduction of the music data when the music data is reproduced from a medium on which the text information is recorded together with the music data.

The present invention is a text information read-output device may include:

an identification information read-out unit for reading out identification information from a medium on which identification information is recorded together with music data;

a text information search unit for searching for text information related to the music data on the basis of the identification information;

a voice synthesizer for obtaining voice data from searched text information; and a controller for controlling a read-out timing of the voice data in synchronism with reproduction of the music data.

The present invention may also be a storage medium readable by a machine tangible embodying a program of instructions executable by the machine to perform method steps for reading out text information from a medium on which text information is recorded together with music data is recorded, the method steps comprising:

extracting text information;

synthesizing voice data from the extracted text information; and controlling a read-out timing of the voice data in synchronism with reproduction of music data.

The present invention may also be a storage medium readable by a machine tangible embodying a program of instructions executable by the machine to perform method steps comprising:

reading out identification information from a medium on which identification information is recorded together with music data;

searching for text information related to the music data on the basis of the identification information;

synthesizing voice data from searched text information; and controlling a read-out timing of the voice data in synchronism with reproduction of the music data.

As described above, according to the present invention, when music is reproduced from a medium on which text information is recorded together with music data, the text information is read out for a listener in synchronism with the reproduction of the music data. For this reason, the text information can be easily and smoothly used.

BRIEF DESCRIPTION OF THE DRAWINGS

FIG. 10 shows a data structure given to a voice synthesis program.

FIG. 14 shows an example of script including a request of searching text information to a database on Internet.

FIG. 15 shows a example of text information from a database on Internet.

FIG. 16 shows a display of text information in a prior art.

DETAILED DESCRIPTION OF THE PREFERRED EMBODIMENT

A preferred embodiment of the present invention will be described below with reference to the drawings in FIGS. 1 to 16.

Figure 1:
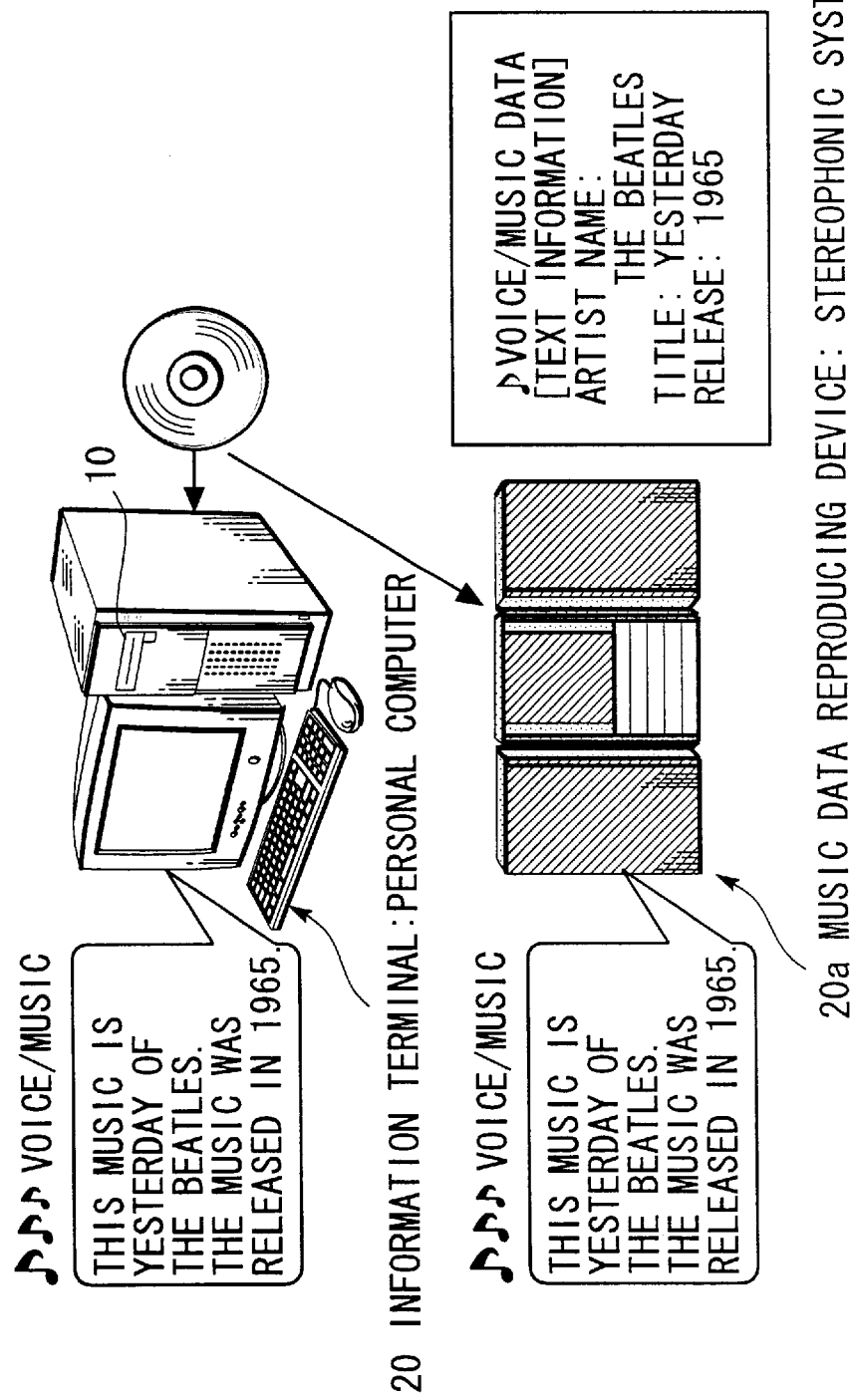
FIG. 1 is an appearance diagram of a text information read-out device according to an embodiment of the present invention.
Figure 2:
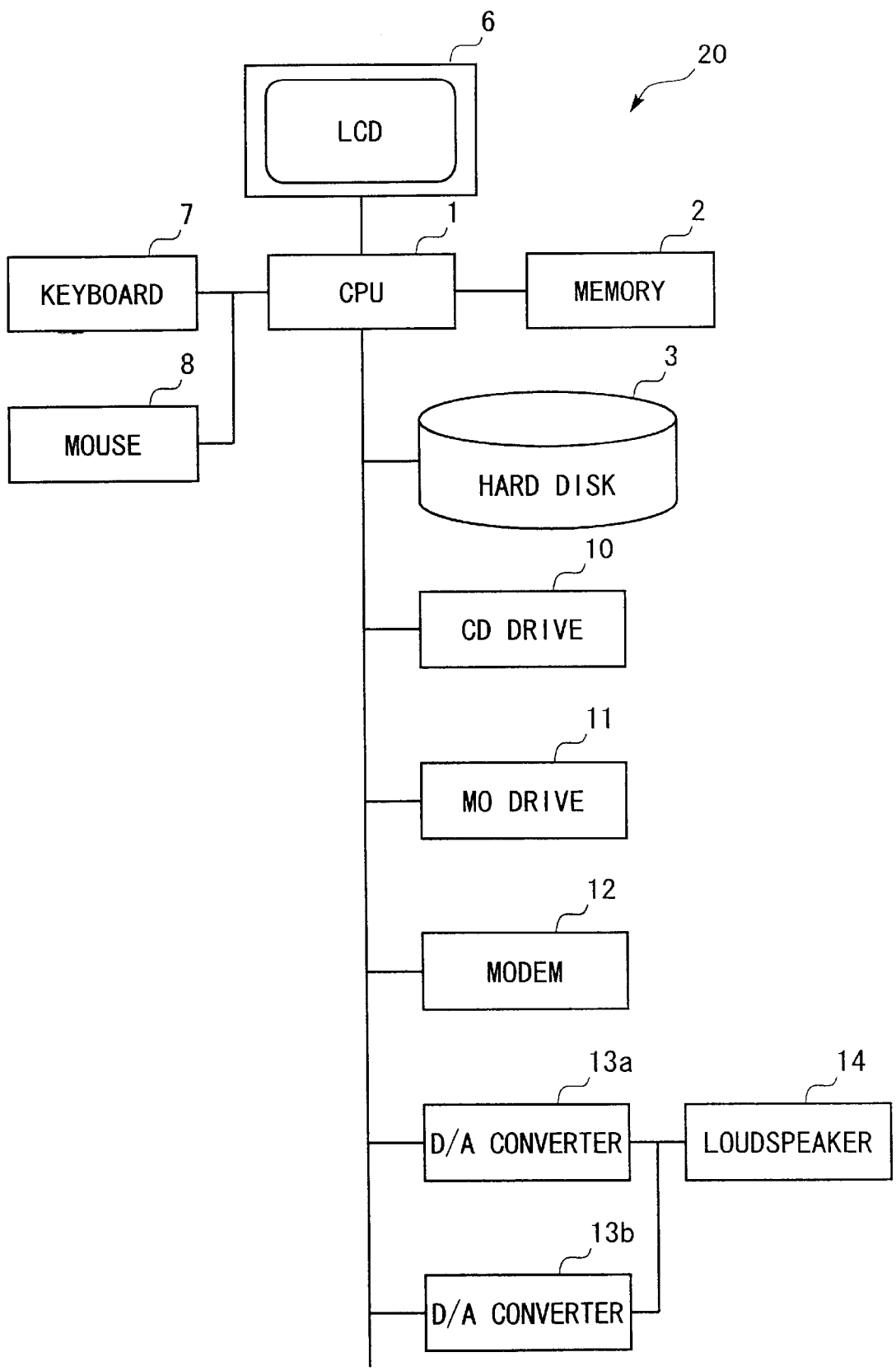
FIG. 2 is a diagram of the hardware configuration of the text information read-out device.
Figure 3:
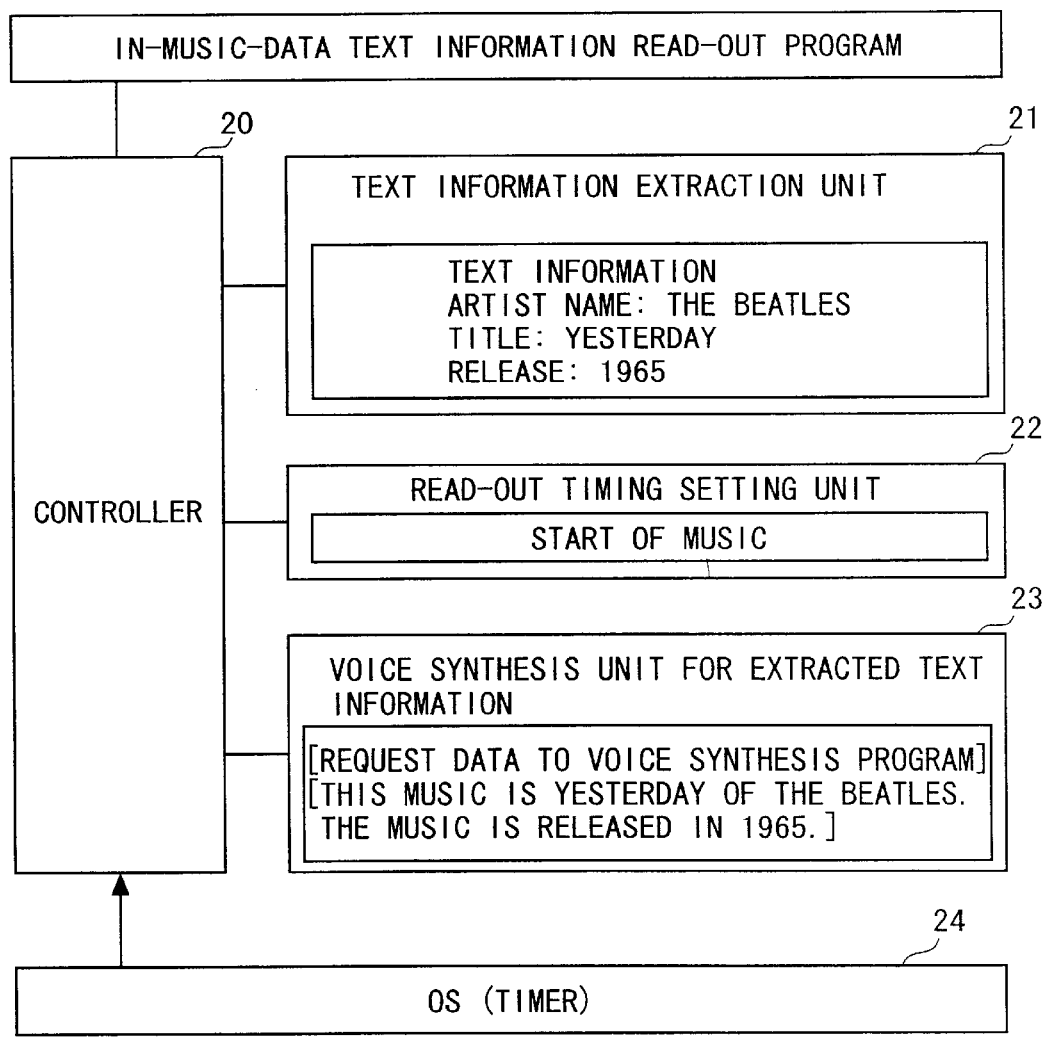
FIG. 3 is a block diagram of a text information read-out program.
Figure 4:
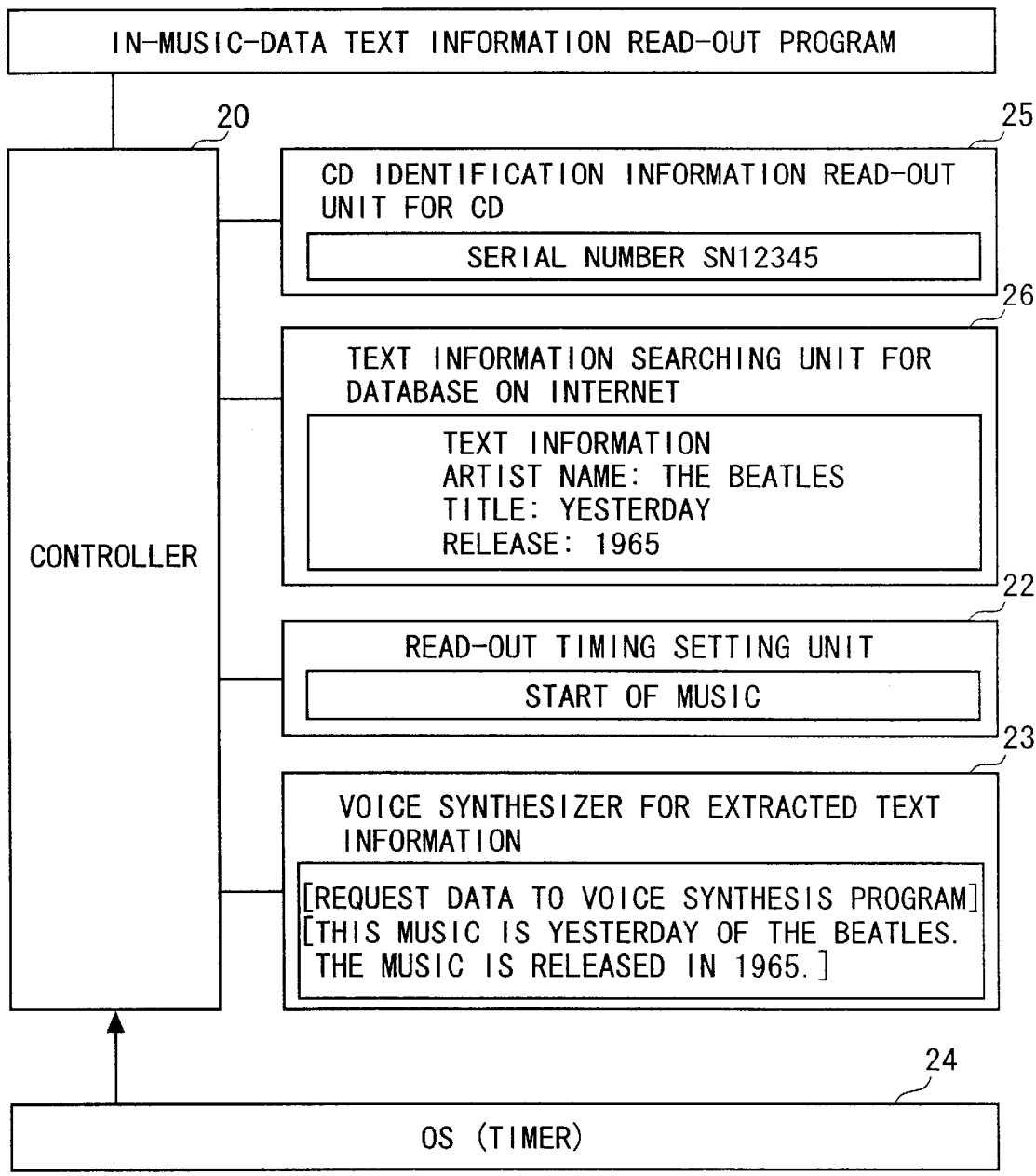
FIG. 4 is a block diagram of a text information read-out program (modification).
Figure 5:
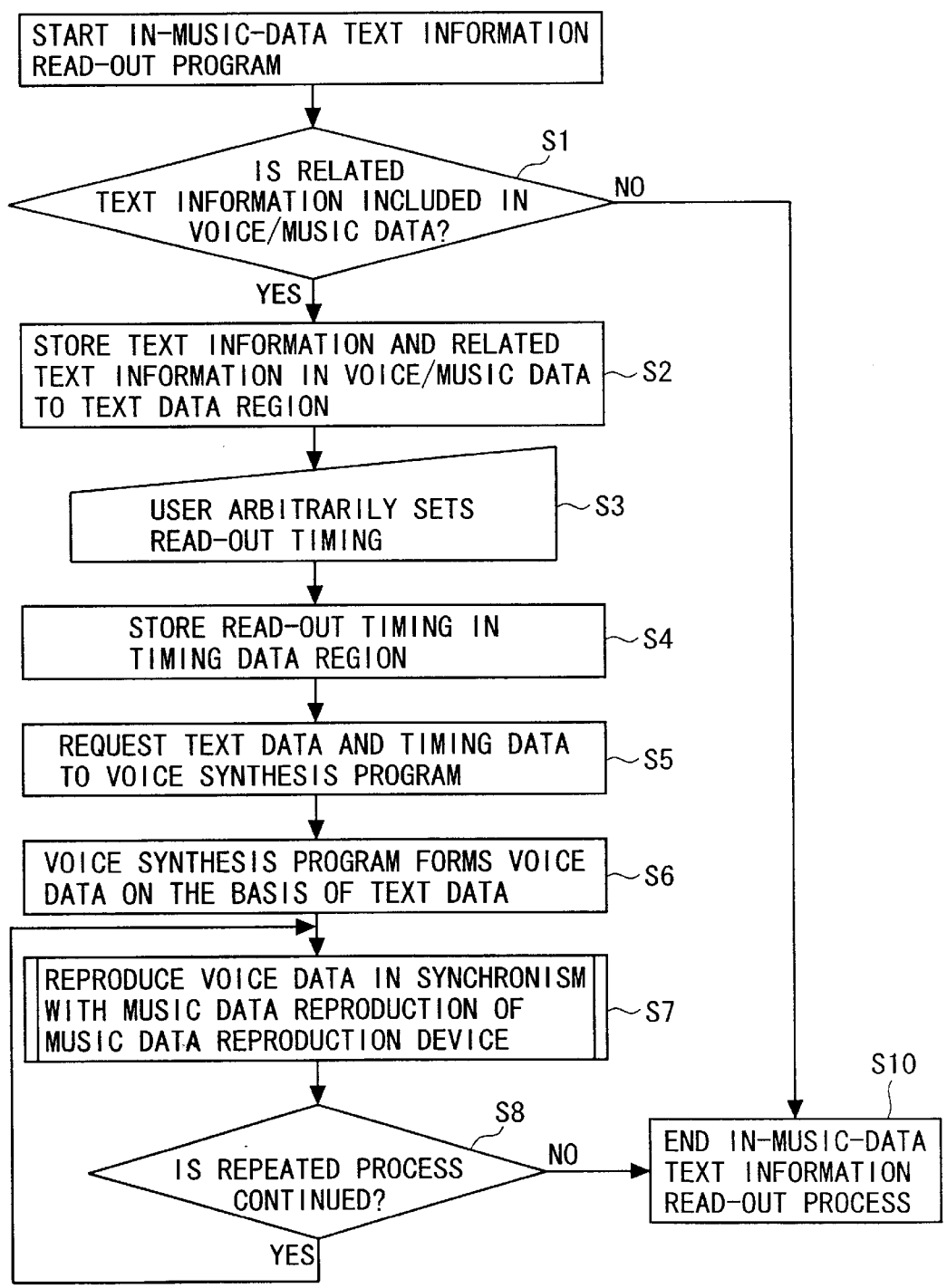
FIG. 5 is a flow chart showing the processes of the text information read-out program.
Figure 6:
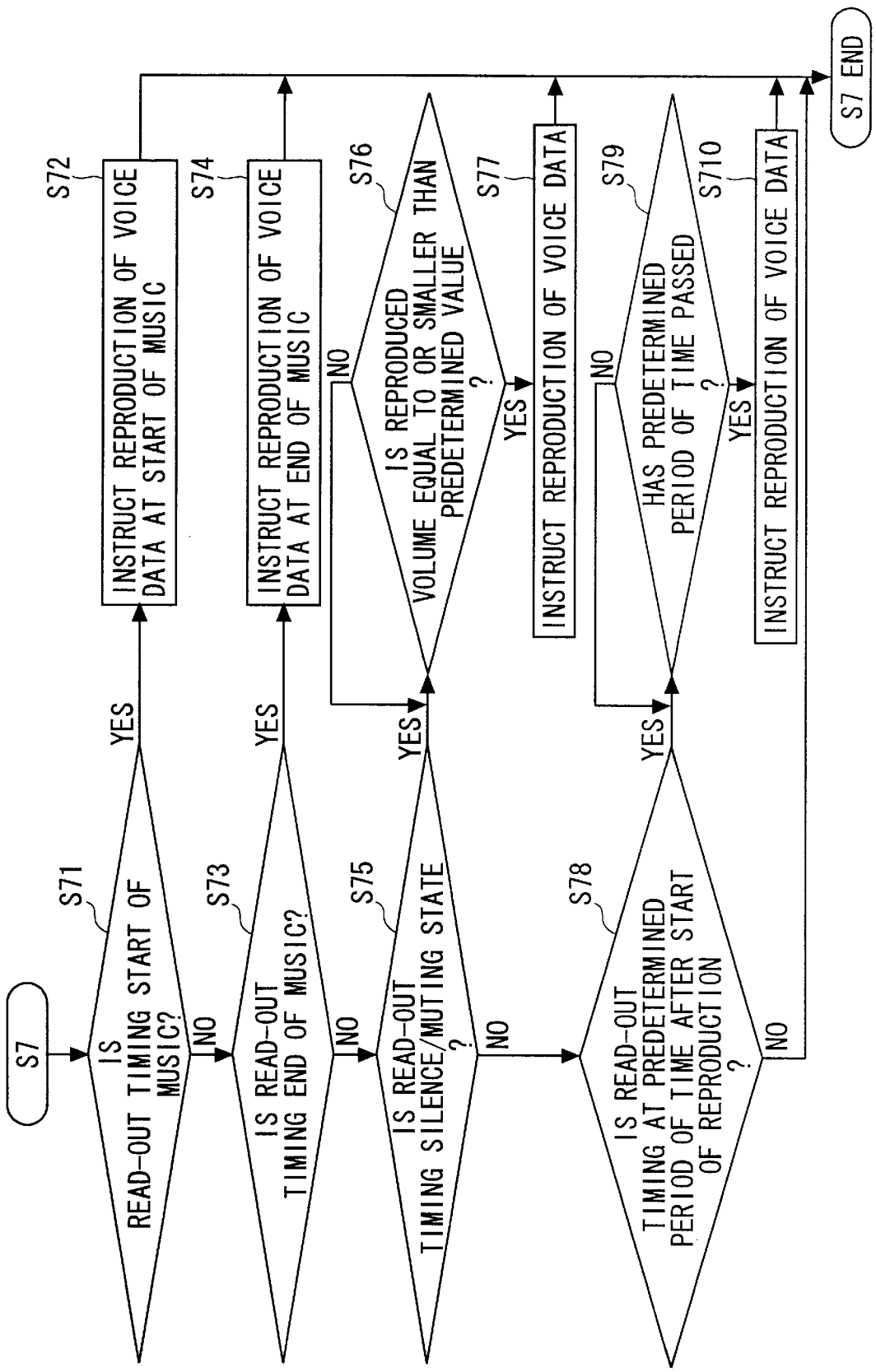
FIG. 6 is a flow chart showing the process of reproducing voice data in synchronism with music data reproduction.
Figure 7:
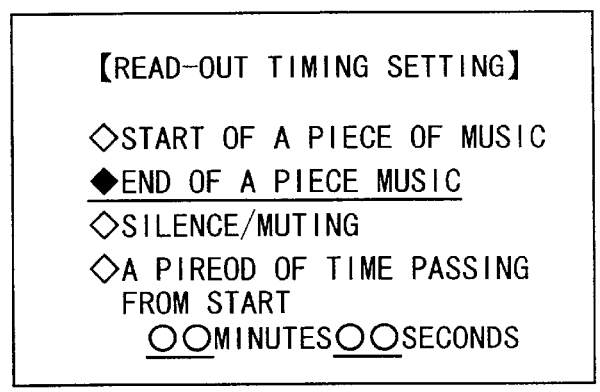
FIG. 7 is a diagram showing an operation screen of a read-out timing setting unit 22.
Figure 8:
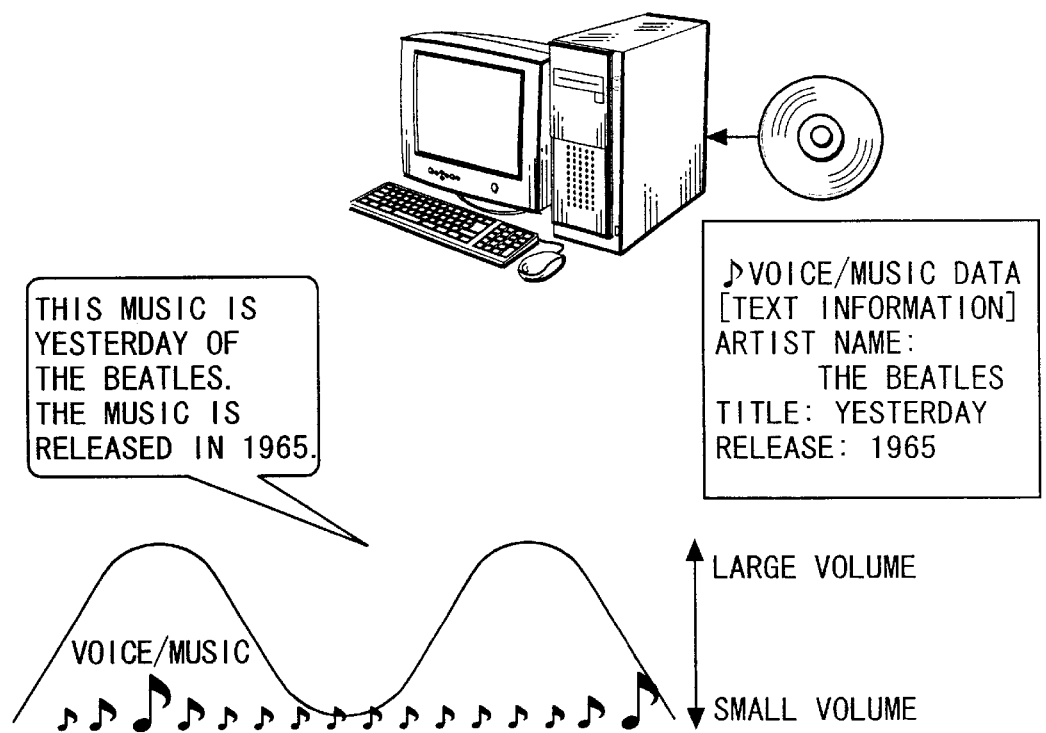
FIG. 8 shows a case in which a read-out timing is controlled by the volume of reproduced music.
Figure 9:
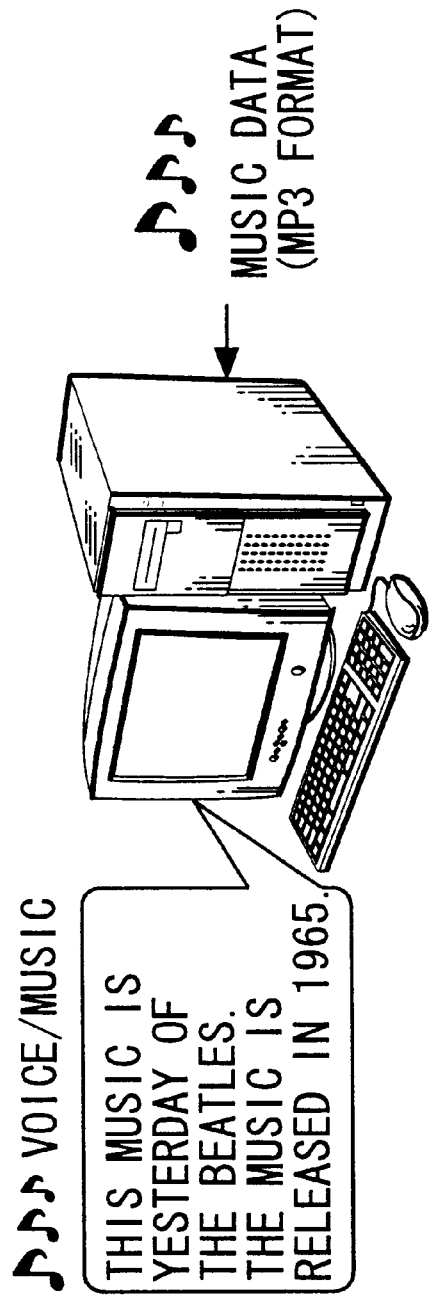
FIG. 9 shows extraction of text information from music data recorded in the MP3 method.
Figure 11:
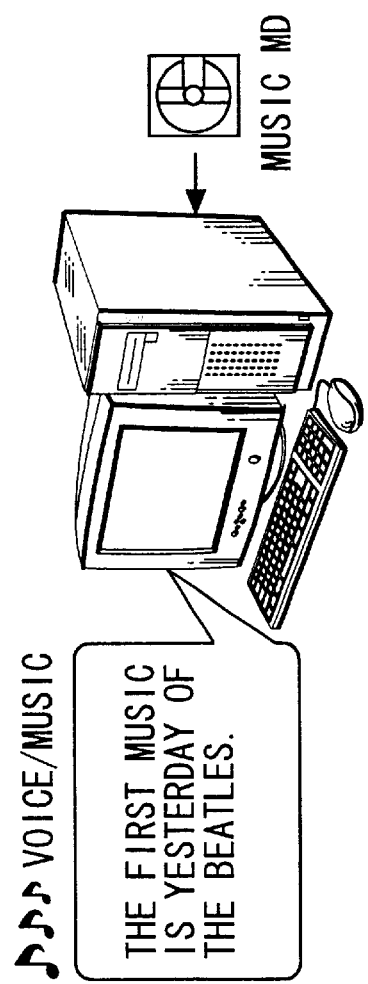
FIG. 11 shows extraction of text information from a music MD.
Figure 12:
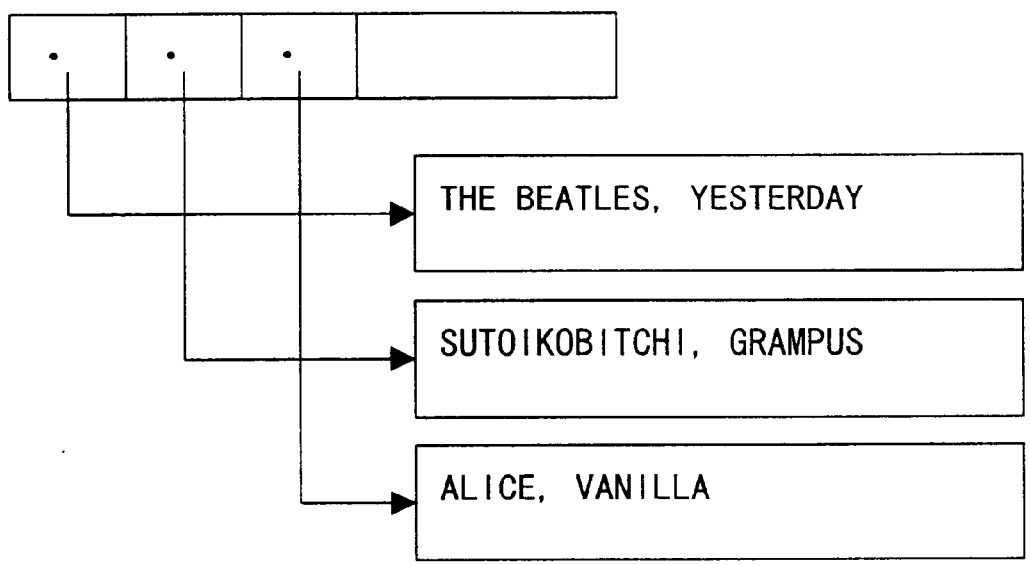
FIG. 12 shows data structure of in-music-MD text information.
Figure 13:
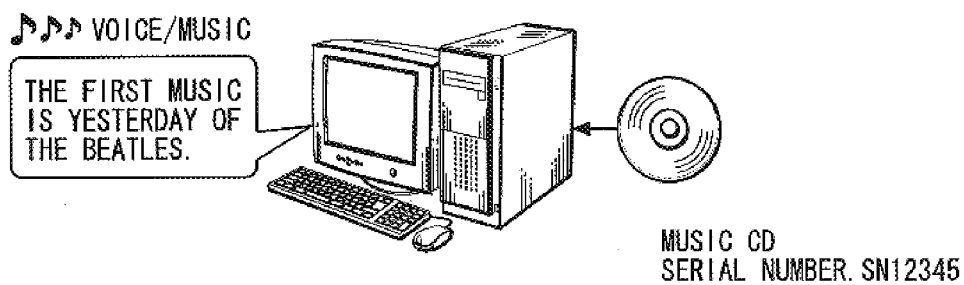
FIG. 13 shows text information searching from a database on Internet.
Figure 13:
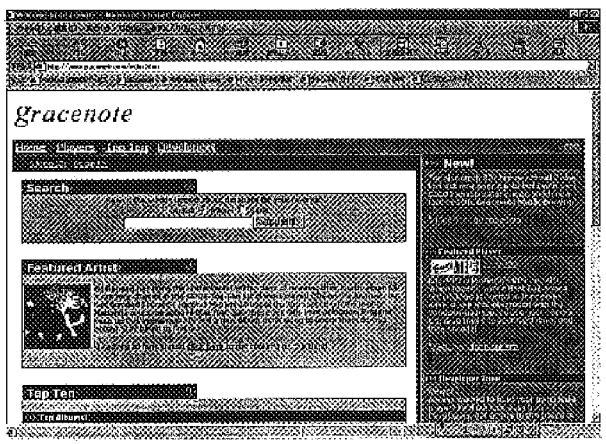

FIG. 1 is an appearance diagram of a text information read-out device according to the embodiment. FIG. 2 is a diagram of the hardware configuration the text information read-out device. FIGS. 3 and 4 are block diagrams of text information read-out programs executed by a CPU 1. FIGS. 5 and 6 are flow charts showing the processes of the text information read-out program. FIG. 7 is a diagram showing an operation screen of a read-out timing setting unit 22 shown in FIG. 3. FIG. 8 shows a diagram showing the process of determining a read-out timing by the volume of reproduced music. FIG. 9 shows extraction of text information from music data recorded in the MP3 method. FIG. 10 is a diagram showing a data structure given to a voice synthesis program. FIGS. 11 and 12 show extraction of text information from music MDs. FIGS. 13 to 15 are text information searching from databases on Internet. FIG. 16 is a display of text information in a prior art.

<Configuration>

FIG. 1 is an appearance diagram of a text information read-out device according to the embodiment. This device is realized such that a text information read-out program is executed in a personal computer 20 on which a CD drive 10 is mounted (a stereophonic system 20a in FIG. 1 is a modification of the embodiment). As shown in FIG. 1, this text information read-out device reads out text information, e.g., "THIS MUSIC IS YESTERDAY OF THE BEATLES AND RELEASED IN 1965." in synchronism with reproduction of music recorded on a CD.

Here, the synchronism means to adjust a read-out start timing. In the text information read-out device according to the embodiment, a user can select, as specifications of synchronism, time conditions such as the reproduction start timing of music, a time elapsing after the reproduction start timing, and the reproduction end timing, or volume conditions such as a silent timing or a timing when the volume of the music decreases.

FIG. 2 is a diagram of the hardware configuration of the text information read-out device. As shown in FIG. 2, this device comprises a CPU 1, a memory 2, a hard disk 3, an LCD 6, a keyboard 7, a mouse 8, and a CD drive 10 which are constituent elements of the conventional personal computer 20. In addition, the text information read-out device comprises an MO drive 11 for reproducing music, a modem 12 for accessing Internet, a D/A converter 13a for reproducing music, a D/A converter 13b for reproducing voice, and a loudspeaker 14.

The CPU 1 executes music data reproduction program (not shown) (corresponding to music data reproduction unit) stored in the memory 2, and transfers music data read from the CD drive or the MO drive to the D/A converter 13a to reproduce music. In addition, the CPU 1 executes a text information read-out program stored in the memory 2 to extract text information and to execute voice synthesis or the like. The synthesized voice is transferred to the D/A converter 13b, converted into an analog signal, and output from the loudspeaker 14. In this manner, by the music data reproduction program and the text information read-out program, the personal computer 20 provides a function as a music reproduction device and a text information read-out device.

The CD drive 10 reads music data, text information, a serial number (corresponding to identification information) of a CD or the like which are recorded on the CD according to a command from the CPU 1 to transfer the music data, the text information, the serial number, and the like to the CPU 1.

The MO drive 11, like the CD drive 10, reads music data, text information, a serial number (corresponding to identification information) of an MO or the like which are recorded on the MD according to a command from the CPU 1 to transfer the music data, the text information, the serial number, and the like to the CPU 1.

The modem 12 is used to cause the CPU 1 to access Internet, to transmit a series of commands (to be referred to as scripts) to a database server in which text information is stored, and to receive text information as the response of the transmission.

The D/A converter 13a is used when music data reproduction program executed by the CPU 1 converts music data read from the CD, MD, or the like into an analog signal. The D/A converter 13b is used to convert voice data synthesized by a voice synthesizer 23 of a text information read-out program executed by the CPU 1 into an analog signal. The loudspeaker 14 converts the analog signal into music or voice to output the music and the voice.

<Text Information Read-out Program>

FIG. 3 is a block diagram of a text information read-out program in music data. This program includes a text information extraction unit 21 for extracting text information stored in a CD or an MO, a read-out timing setting unit 22 for setting a timing at which the text information is read out in accordance with the music data, a voice synthesizer 23 for synthesizing voice from the extracted text information, and a controller 20 for controlling these constituent elements of the program.

An OS 20 controls the personal computer 20 as a whole. The OS 20 causes an incorporated timer to clock a predetermined period of passing time according to the setting from the controller 20 to inform the controller 20 of the predetermined period of passing time.

<Text Information Extraction Unit 21>

The text information extraction unit 21 accesses a music medium such as a CD to extract text information recorded together with music data.

FIG. 9 shows extraction of text information from music data recorded in the MP3 method (the audio data standards of MPEG). In the MP3 method, text information is recorded in a table format having a fixed length determined by standards called ID3 tag. As shown in FIG. 9, the fixed length table is constituted by the title (e.g., "Yesterday"), name of the artist (The Beatles) title of the album, year (e.g., 1966), and type (e.g., pops) of music, and a comment. The text information extraction unit 21 can extract text information from the MP3 by using a structure variable consisting of the same element as that of the fixed length table.

FIGS. 11 and 12 show extraction of text information from a music MD. In the music MD, text information is recorded in the format of Table Of Contents (to be referred as TOC hereinafter) as shown in FIG. 11. This TOC is actually constituted by a pointer table having a fixed length as shown in FIG. 12. The pointer held by each entry of this table indicates the start address of a text region in which the players, titles, and the like of pieces of music in the order of the pieces of music. For example, FIG. 11 shows a case that "Yesterday" of the Beatles is recorded as the first pieces of music. Therefore, the text information extraction unit 21 sequentially traces the pointers of the fixed length table from the beginning shown in FIG. 12, so that text information can be sequentially extracted from the first piece of music.

<Read-out Timing Setting Unit 22>

The read-out timing setting unit 22 is used to designate a timing at which voice synthesized by the voice synthesizer 23 is read out (voice is output through the loudspeaker 14). In this manner, a timing at which the text information is read out with respect to reproduced music data is designated.

FIG. 7 shows an operation screen of the read-out timing setting unit 22. A user can select a desired timing from the operation screen displayed on an LCD 6 by using a mouse 8 or a keyboard 7.

In FIG. 7, the start of a piece of music indicates that text information is read out in synchronism with a start timing (start timing of each piece of music) at which reproduction of the music data is started, the end of a piece of music indicates that text information is read out in synchronism with the timing (end timing of each piece of music) at which reproduction of the music data is ended.

Silence/muting indicates that text information is read out at the timing at which the volume of a piece of music to be reproduced is in a silent state or at which the volume is equal to or smaller than a predetermined value. As shown in FIG. 6, the CPU 1 monitors the volume of a piece of music to be reproduced (more specifically, the number of bits of data given to the input circuit of the D/A converter 13a). When the volume is equal to or smaller than the predetermined value, the controller 20 transfers voice data synthesized in the voice synthesizer 23 to the D/A converter 13b.

A period of time passing from the start indicates that text information is read out at a predetermined period of time after the start timing (start timing of each piece of music) at which music data is reproduced.

<Voice Synthesizer 23>

The voice synthesizer 23 gives text information subjected to voice synthesis to a voice synthesis program (not shown) (e.g., "Voice series" available from Fujitsu Ltd.), and instructs the voice synthesis program to synthesize voice.

FIG. 10 shows a data structure given to the voice synthesis program. This data structure has a table format, and includes text information to be synthesized according to the order of pieces of music. As shown in FIG. 10, e.g., the text information of the first piece of music is "THIS MUSIC IS YESTERDAY OF THE BEATLES, AND RELEASED IN 1965". The voice synthesizer 23 gives the request having the table format to the voice synthesis program, and converts text information of each piece of music into voice data.

<Controller 20>

The controller 20 sequentially starts the text information extraction unit 21, the read-out timing setting unit 22, and the voice synthesizer 23.

The controller 20 outputs the voice data formed by the voice synthesizer 23 from the loudspeaker 14 through the D/A converter 13b in synchronism with reproduction of music data. In the synchronism, the controller 20 receives the notification of the start of reproduction of music data or the end of reproduction (end of a piece of music) by interruption from music data reproduction program (not shown).

In addition, when the read-out timing of the text information is designated by a period of passing time from the start, the controller 20 sets notification time in a timer incorporated in the CPU 1 through OS24 to perform clocking, and controls the timing of outputting voice.

<Operation>

Processes of a text information read-out program (to be referred to as a control program) executed by the CPU 1 will be described below with reference to the flow chart in FIG. 5.

The control program decides whether related text information is included in music data prior to reproduction of the music data or not (step S1 to be referred to as S1 hereinafter). In, e.g., the MP3 format, this decision is made by checking whether the ID3 tag shown in FIG. 9 is null data or not. If no text data is included in the music data, the control program ends the process (S10).

If the text information is included in the music data, the control program stores the text information in a data structure (to be referred to as a text data region hereinafter) in FIG. 10 given to a voice synthesis program (S2, the process of the text information extraction unit 21).

The control program waits until a user of the text information read-out device sets a read-out timing (S3, the process of the read-out timing setting unit 22). If the user does not set a timing, a predetermined default is used instead. Then the control program sets the read-out timing in a predetermined timing data region (S4).

The control program gives the text data region to the voice synthesis program (not shown) to make a request of voice synthesis (S5, the process of the voice synthesizer 23). In this manner, voice data is synthesized from the text information (S6).

The music data reproduction program transfers music data to the D/A converter 13a to reproduce music. In synchronism with the reproduction, the control program transfers the voice data synthesized as described above to the D/A converter 13b to reproduce voice data (S7). Here, the synchronism means that the timing of the reproduction of the voice data is matched to the timing of reproduction of a piece of music on the basis of the start of the piece of music, the end of the piece of music, silence/muting, a period of passing time from the start of reproduction, that is set by operation screen of the read-out timing setting unit 22 in FIG. 7 (described above). The details is shown in the flow chart in FIG. 6.

<Process of Reproducing Voice Data in Synchronism with Music Data Reproduction>

The control program decides the setting of a read-out timing set on the screen in FIG. 7 (to be described below) (S71, S73, S75, and S78).

When the read-out timing is the start of a piece of music, the control program instructs reproduction of voice data at the start of reproduction of the music data (S72). In this manner, the voice data is transferred to the D/A converter 13b, and voice is output from the loudspeaker 14.

When the read-out timing is the end of a piece of music, the control program instructs reproduction of voice data at the end of reproduction of the music data (S74). In this manner, the voice data is transferred to the D/A converter 13b, and voice is output from the loudspeaker 14.

When the read-out timing is the silence/muting, the control program monitors the volume of a piece of music to be reproduced depending on the number of bits of the music data to be transmitted to the D/A converter 13 (S76). When the volume of the piece of music to be reproduced is equal to or smaller than a predetermined value, the control program instructs reproduction of voice data (S77). In this manner, the voice data is transferred to the D/A converter 13b, and voice is output from the loudspeaker 14.

When the read-out timing is a timing at a predetermined period of passing time after the start of reproduction of music data, the control program start a timer (not shown) through an OS 24. After notification is made from a timer by a predetermined period of passing time after the start of reproduction (in case of Yes in the decision in S79), the control program instructs reproduction of voice data (S710). In this manner, the voice data is transferred to the D/A converter 13b, and voice is output from the loudspeaker 14.

In this manner, the control program ends the process (S7) of reproducing the voice data in synchronism with reproduction of the music data. In addition, in the process of S8 in FIG. 5, the control program decides whether the reproduction is continuously repeated again or not. If the reproduction is not repeated, the text information read-out process is ended (S10).

In this manner, according to the text information read-out device, text information recorded together with music data is synthesized as voice data in response to reproduction of the music data, and voice is reproduced in synchronism with reproduction of the music data. For this reason, even in a reproduction device which has no display device such as an LCD for displaying text information, a listener can acquire the text information. In addition, when a listener listens to music by using a reproduction device having a display device, the listener can smoothly listen to the music and can smoothly acquire the text information if the posture of the listener need not to be changed to see the text information.

<Modification>

<Search of Text Information from Database on Internet>

In the text information read-out device of the above embodiment, when text information is recorded on a medium on which music data is recorded as in the same data format of the MP3 or recorded in as in the same medium of the TOC of the MD, the text information is read out to synthesize voice. In place of this, a text information read-out device for reading out text information recorded on a medium which is different from a medium on which music data is recorded will be described below.

FIG. 4 is a block diagram of a text information read-out program executed by a CPU 1 of this device. In the program in FIG. 4, a text information extraction unit 21 in the block diagram of FIG. 3 is replaced with a CD identification information read out unit 25 and a text information searching unit 26 for a database on Internet. The other configuration is the same as that in the above embodiment. The same reference numerals as in the above embodiment denote the same units in this modification, and a description thereof will be omitted.

The CD identification information read out unit 25 reads a serial number (corresponding to identification information) which is held in a CD and is uniquely identified in the world according to the type of the CDs.

The text information searching unit 26 for a database on Internet accesses the database on Internet by using the serial number as a key to search for text information stored in correspondence with the CD.

FIG. 13 shows a case in which a music CD database CDDB (http://www.cddb.com/) on Internet to obtain the title of a piece of music in a music CD.

Serial numbers which can uniquely identify the types of CDs in the world are added to all the music CDs. The database CDDB provides information related to music CDs sold in the world. For this reason, in general, a user searches the database CDDB by using a browsing program of an HTML as shown in FIG. 13. On the other hand, when a searching request is formed by the format of a script format described by a predetermined command string, a search result can be received in execution of the program.

FIG. 14 shows a script including a request of searching text information to the CDDB. By Discid: 470a6507 of the third line of the script, serial number 470a6507 of a CD about which a user requests text information is designated. The text information searching unit 26 to the database on Internet refers to the serial number of a CD, forms such a script, and transmits the script to the CDDB. Then the text information searching unit 26 to the database on Internet can receive text information related to the CD having the serial number as a return.

FIG. 15 shows the returned text information. With respect to the CD of the serial number 470a6507 designated by the script, text information representing that the title of the CD is Led Zeppelin/Presence, that the first piece of music is Achilles' Last Stand, that the second piece of music is For Your Life, and the like can be obtained.

By using the text information, text information can be read out in synchronism with reproduction of music even though the text information is not recorded on the medium. When the text information recorded on the medium is not revised, the latest text information can be obtained. In addition, information other than the title of the piece of music described above, for example, the latest topics of the music and the composer of the pieces of music, or the like are obtained. For this reason, a style of listening to music is changed, and various pieces of information can be obtained while listening to music.

In the above example, text information is searched by using the CDDB on Internet as a database in which titles of pieces of music are recorded. However, the embodiment of the present invention is not limited to the configuration of the database. More specifically, as long as a database can be searched by using identification information such as the serial number of a CD for uniquely identifying the type of a music medium, for example, a database server in a local area network, a database using a local disk incorporated in a personal computer, and the like can be used.

<Computer Readable Recording Medium>

The text information read-out program described in the embodiment is recorded on a computer readable recording medium, is loaded on the computer, and executed together with the OS 24 installed in the computer and a voice synthesis program (not shown). In this case, the computer can be functioned as a text information read-out device of the embodiment.

More specifically, in the embodiment of the present invention, the program of executing the processes of FIGS. 5 and 6 may be recorded on a computer readable recording medium, loaded on a computer, and executed. On the other hand, if the voice synthesis program is installed in the computer, the voice synthesis program need not be recorded on the recording medium.

Here, the computer readable recording medium is a recording medium in which information such as data and programs are stored by electric, magnetic, optical, mechanical, and chemical effect and can be read by the computer. As a recording media, among those which can be removed from the computer, for example, a floppy disk, a photomagnetic disk, a CD-ROM, a CD-R/W, a DVD, a DAT, an 8 mm tape, a memory card, or the like is used.

As a recording medium fixed in a computer, a hard disk, or a ROM (Read Only Memory) are known.

<Data Communication Signal Embodied in Carrier Wave>

The text information read-out program is stored in a hard disk or a memory in the computer, and can be distributed to other computers through communication media. In this case, the program is transmitted through a communication medium as a data communication signal Embodied in a carrier wave. The computer to which the data communication signal is distributed can be functioned as the text information read-out device of the embodiment.

As the communication medium, a cable communication medium (metal cables including a coaxial cable and a twist pair cable or a optical communication cable), a wireless communication medium (satellite communication, ground wireless communication, or the like), or the like may be used.

The carrier wave is an electromagnetic wave or light for modulating a data communication signal. The carrier wave may be a DC signal (in this case, the data communication signal has a baseband waveform which has no carrier wave).

Therefore, the data communication signal Embodied in the carrier wave may be either of a modulated broadband signal or a base band signal which is not modulated (corresponding to a case in which a DC signal having a voltage of 0 is used as a carrier wave).

<Another Modification>

In the embodiment, the personal computer 20 including a voice synthesis program as a text information read-out device has been exemplified. However, the embodiment of the present invention is not limited to this case. The embodiment can also be applied as a device which comprises a CPU 1 being capable of executing the processes of FIGS. 5 and 6 and a voice synthesis program and which can read music data and text data from a medium such as a CD or an MD, for example, a stereophonic system 20a shown in FIG. 1.

In this embodiment, a recording format of text information is not limited to a specific format. In the embodiment of the present invention, text information can be recorded on a medium in a normal ASCII format or a binary format for data compression.

What is claimed is:

1. A text information read-out device reading out text information from a medium on which text information is stored together with music data, comprising:
   a text information extraction unit extracting text information related to the music data;
   a voice synthesizer obtaining voice data from the extracted text information; and
   a controller controlling a read-out timing of the voice data in synchronism with reproduction of music data.

2. A text information read-out device according to claim 1, wherein the controller controls a read-out timing of the voice data to any one of a reproduction start timing of the music data, a predetermined period of time after the reproduction start timing of the music data, and a reproduction end timing of the music data.

3. A text information read-out device according to claim 1, wherein the controller controls a read-out timing of voice data on the basis of a volume of the music data to be reproduced.

4. A text information read-out device comprising:
   an identification information read-out unit reading out identification information from a medium on which identification information is recorded together with music data;
   a text information search unit searching for text information related to the music data on the basis of the identification information;
   a voice synthesizer obtaining voice data from searched text information; and
   a controller controlling a read-out timing of the voice data in synchronism with reproduction of the music data.

5. A storage medium readable by a machine tangible embodying a program of instructions executable by the machine to perform method steps for reading out text information from a medium on which text information is recorded together with music data is recorded, the method steps comprising:
   extracting text information related to the music data;
   synthesizing voice data from the extracted text information; and
   controlling a read-out timing of the voice data in synchronism with reproduction of music data.

6. A storage medium readable by a machine tangible embodying a program of instructions executable by the machine to perform method steps comprising:

reading out identification information from a medium on which identification information is recorded together with music data;

searching for text information related to the music data on the basis of the identification information;

synthesizing voice data from searched text information; and controlling a read-out timing of the voice data in synchronism with reproduction of the music data.

7. A music/voice reproduction device which perform reproduction of music data and read-out of text information from a medium on which the text information is stored together with the music data, comprising:

a text information extraction unit extracting text information related to the music data;

a voice synthesizer obtaining voice data from the extracted text information;

a music data reproduction unit reproducing the music data; and a controller controlling a read-out timing of the voice data in synchronism with reproduction of music data.

8. A music/voice reproduction device comprising:

an identification information read-out unit reading out identification information from a medium on which identification information is recorded together with music data;

a text information search unit searching for text information related to the music data on the basis of the identification information;

a voice synthesizer obtaining voice data from searched text information;

a music data reproduction unit reproducing music data; and a controller controlling a read-out timing of the voice data in synchronism with reproduction of the music data.

* * * * *

UNITED STATES PATENT AND TRADEMARK OFFICE
CERTIFICATE OF CORRECTION

PATENT NO. : 6,694,297 B2
DATED : February 17, 2004
INVENTOR(S) : Tatsuhiro Sato It is certified that error appears in the above-identified patent and that said Letters Patent is hereby corrected as shown below:

Column 10,
Line 31, after "data" insert -- , wherein the text information includes at least one of artist name, title, and release --;
Line 54, change "tangible" to -- tangibly --; and
Line 64, after "data" insert -- , wherein the text information includes at least one of artist name, title, and release --.

Column 12,
Line 2, after "data" insert -- , wherein the text information includes at least one of artist name, title, and release --.

Signed and Sealed this

Fifth Day of October, 2004

JON W. DUDAS
*Director of the United States Patent and Trademark Office*